(12) United States Patent
Bettink et al.

(10) Patent No.: US 8,234,401 B2
(45) Date of Patent: Jul. 31, 2012

(54) ADAPTIVE POLICERS RESPONSIVE TO UTILIZATION LEVELS OF A RESOURCE

(75) Inventors: John H. W. Bettink, San Jose, CA (US); Mohammed Ismael Tatar, Kanata (CA); Palani Chinnakannan, San Jose, CA (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 12/827,031

(22) Filed: Jun. 30, 2010

(65) Prior Publication Data
US 2012/0005367 A1    Jan. 5, 2012

(51) Int. Cl.
G06F 15/16    (2006.01)
(52) U.S. Cl. ........ 709/233; 709/230; 709/223; 709/224; 709/235; 370/229; 370/235; 370/230; 370/231; 370/252; 370/253; 370/236; 370/237
(58) Field of Classification Search .................. 709/233, 709/230, 223, 224, 235
See application file for complete search history.

(56) References Cited

U.S. PATENT DOCUMENTS

| | | | | |
|---|---|---|---|---|
| 6,175,568 B1 * | 1/2001 | Awdeh | ........................ | 370/236.1 |
| 6,463,068 B1 | 10/2002 | Lin et al. | | |
| 6,826,147 B1 * | 11/2004 | Nandy et al. | .................. | 370/229 |
| 7,680,049 B2 * | 3/2010 | Olsen et al. | ................. | 370/235.1 |
| 8,077,611 B2 | 12/2011 | Bettink et al. | | |
| 8,170,045 B2 | 5/2012 | Pan et al. | | |
| 2003/0189934 A1 | 10/2003 | Jeffries et al. | | |
| 2003/0189943 A1 | 10/2003 | Gorti et al. | | |
| 2005/0083845 A1 | 4/2005 | Compton et al. | | |
| 2005/0094567 A1 | 5/2005 | Kannan et al. | | |
| 2005/0201284 A1 * | 9/2005 | Cheriton | ........................ | 370/232 |
| 2007/0091802 A1 | 4/2007 | Pan et al. | | |
| 2009/0109847 A1 * | 4/2009 | Stephenson et al. | .......... | 370/232 |
| 2010/0071024 A1 * | 3/2010 | Eyada | ............................... | 726/1 |

OTHER PUBLICATIONS

Pan et al., "Approximate Fairness through Differential Dropping," ACM SIGCOMM Computer Communication Review, vol. 33, Issue 2, (Apr. 2003), pp. 23-39.
Le et al., "Differential Congestion Notification: Taming the Elephants,"Proceedings of the 12th IEEE International Conference on Network Protocols (ICNP'04), IEEE Computer Society, (2004), pp. 118-128.
Branden et al., "Recommendations on Queue Management and Congestion Avoidance in the Internet," RFC 2309, IETF, Apr. 1998 (17 pages).
"Comparing Traffic Policing and Traffic Shaping for Bandwidth Limiting," Cisco Systems, Inc., 2008 (8 pages).

* cited by examiner

Primary Examiner — Jude Jean Gilles
(74) Attorney, Agent, or Firm — The Law Office of Kirk D. Williams (57) ABSTRACT

Policers receive packets of flows of packet traffic, which are to be communicated to monitored resource. The utilization levels of the monitored resource are induced by these flows of packet traffic. Based on the observed utilization levels (including possibly measured durations in one or more of these utilization levels), a determination is made if, and how to adjust policers for policing their respective flow, with policers being adjusted accordingly. In this manner, adaptive policers (typically located remotely from the monitored resource) are adjusted in response to one or more utilization levels (including possible durations at these utilization levels—i.e., a persistence of the congestion for the resource) of one or more monitored resources, with these identified utilization levels (and possibly durations) used in determining how much to modify a policing rate.

26 Claims, 7 Drawing Sheets

501 INITIALIZATION
INITIAL POLICER RATE = $R_I$
ADJUSTED POLICER RATE = $R_A$
SAMPLING PERIOD = $T_S$
CONGESTED PERIOD = $T_C$
INITIAL UP RATE WEIGHT = $W_I$
CURRENT UP RATE = $W_C$
$R_A = R_I$
$W_C = W_I$

502 DOWN-RATE ADJUSTMENT
$R_A = R_A * (1 - T_C / T_S)$
$W_C = W_I$

503 UP-RATE ADJUSTMENT
$R_A = R_A + (W_C/100) * (R_I - R_A)/R_I$
$W_C = 2 * W_C$

ADAPTIVE POLICERS RESPONSIVE TO UTILIZATION LEVELS OF A RESOURCE

TECHNICAL FIELD

The present disclosure relates generally to communications devices, such as, packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Unfortunately, malicious packet traffic may be received by a packet switching device, such as that part of a denial of service (DOS) or distributed DOS (DDOS) attack. It is important to be able to counter the effects of such attacks, while maintaining the operability of the packet switching device.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with adaptive policers responsive to one or more utilization levels of one or more monitored resources. In one embodiment, a particular machine performs a method, which includes: policing, at corresponding policing rates by a plurality of policers of a particular machine, a plurality of aggregate flows of packet traffic in transit to a resource; wherein each of the plurality of aggregate flows of packet traffic is said rate limited by a different one of the plurality of policers; and adjusting, by the particular machine, at least one said policing rate of one or more of the plurality of policers by an amount relative to a utilization of the resource; wherein the amount of utilization of the resource is affected by packets of the plurality of aggregate flows of packet traffic (and possibly by other traffic or uses).

2. Description

Disclosed are, inter alia, methods, apparatus, computer-storage media, mechanisms, and means associated with adaptive policers responsive to one or more utilization levels of one or more monitored resources. In one embodiment, policers receive packets of flows of packet traffic, which are to be communicated to monitored resource. The utilization levels of the monitored resource are induced by these flows of packet traffic. Based on the observed utilization levels (including possibly measured durations in one or more of these utilization levels), a determination is made if, and how to adjust policers for policing their respective flow, with policers being adjusted accordingly. In this manner, adaptive policers (typically located remotely from the monitored resource) are adjusted in response to one or more utilization levels (including possible durations at these utilization levels—i.e., a persistence of the congestion for the resource) of one or more monitored resources, with these identified utilization levels (and possibly durations) used in determining how much to modify a policing rate.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with adaptive policers responsive to one or more utilization levels of one or more monitored resources. Note, as used herein, the term "policer" refers to a rate-controller of an associated flow of traffic such that the flow does not exceed a predefined restricted rate. A policer makes a forward or drop decision on a packet based on the restricted rate and allowed traffic (such as by using a token bucket and identifying if there are enough tokens to forward the packet; else drop or mark for possible dropping of the packet). A policer does not delay a packet waiting for credit to accumulate to allow the policer to send the packet. Thus, a policer is different than, and is not a shaper nor a scheduler. Note, the term flow of traffic as used herein may refer to an individual flow of packet traffic (such as that identified by a source address, source port, destination address, destination port, and protocol type). The term "aggregate flow" refers to one or more flows of packet traffic. Thus, a policer assigned to police an aggregate flow of packet traffic, will rate limit one or more flows of packet traffic by either allowing; or dropping or marking for dropping packets. Further, the reference to reducing the policing rate, typically refers to reducing the rate that traffic is allowed (thus, increasing the number of packets that are dropped or marked for dropping).

One embodiment addresses the problem of packet overload typically induced by increased packet traffic, such as, but not limited to that caused by a denial of service (DOS) or distributed DOS (DDOS) attack on a congestion point in a packet switching device. A packet switching device may include multiple interfaces on a line card receiving data traffic that includes both traffic to be forwarded from the packet switching device and traffic destined for the packet switching device itself (e.g., traffic sent to the local line card central processing unit (CPU) for further processing). Examples of this packet traffic include: ARP packets, and layer-2 or layer-3 keep alive packets, routing protocol control messages, router management and administration messages. When an excessively large number of packets are received that are destined to the packet switching device itself (whether regular packet traffic or while under attack), a congestion point within the packet switching device may be susceptible to overload. Examples of a congestion point, include, but are not limited to: the control plane, packet switching engine, ingress traffic shaping points, egress traffic shaping points, system fabric, the route processor and its interface, packet queues, route processor, etc. One embodiment monitors one or more congestion points, and in response to an overload condition, adjusts one or more policers (or groups of policers) along one or more paths leading to the congestion point.

For example, one embodiment monitors the utilization level of the route processor or queues associated therewith on a route processing card (e.g., a resource is monitored). In response to an identified congestion condition (e.g., a processor usage exceeding a predetermined usage threshold, queue lengths exceeding a predetermined length threshold, queues overflowing), one embodiment adjusts policers, typically located remotely from the resource (e.g., on different cards, on a same card but upstream of the monitored resource) in order to reduce traffic of one or more flows of packet traffic that is inducing the resource utilization level. One embodiment adjusts the policers based on one or more durations (e.g., time, counts, cycles, number of elements processed, percentage such as n percent of a time period) of the utilization level being identified in one or more levels of congestion. This adjustment of the policer(s) may be to reduce or increase the packet traffic allowed through the policer for one or more flows of packets.

Disclosed are, inter alia, methods, apparatus, computer-storage media, mechanisms, and means associated with adaptive policers responsive to one or more utilization levels of one or more monitored resources. In one embodiment, a particular machine performs a method, which includes: policing, at corresponding policing rates by a plurality of policers of a particular machine, a plurality of aggregate flows of packet traffic in transit to a resource; wherein each of the plurality of aggregate flows of packet traffic is said rate limited by a different one of the plurality of policers; and adjusting, by the particular machine, at least one said policing rate of one or more of the plurality of policers by an amount relative to a utilization of the resource; wherein the amount of utilization of the resource is affected by packets of the plurality of aggregate flows of packet traffic (and possibly by other traffic or uses).

In one embodiment, said policing operation is defined as rate-limiting of traffic to a predetermined rate by either allowing, dropping, or marking for dropping of packets, but not delaying the sending of a packet until the flow is within the predetermined rate. In one embodiment, the plurality of policers are co-located on a card of the particular machine, and the resource is located on a different card of the particular machine. In one embodiment, the resource includes one or more elements from a group of elements comprising: a queue and a processing element. In one embodiment, said adjusting of the policing rate includes changing the fill rate of a token bucket associated with a policer of the plurality of policers. In one embodiment, the amount of said adjusting operation is determined based on one or more durations that the amount of utilization of the resource is at one or more predetermined utilization levels. In one embodiment, at least one of said one or more predetermined utilization levels corresponds to the utilization of the resource being in a congested condition; and wherein said adjusting of at least one said policing rate results in reducing an allowed traffic rate of at least one of the plurality of aggregate flows based on at least one particular duration of said one or more durations that the utilization of the resource was in the congested condition. In one embodiment, at least one of said one or more predetermined utilization levels corresponds to the utilization of the resource not being in a congested condition; and wherein said adjusting of at least one said policing rate results in increasing an allowed traffic rate of at least one of the plurality of aggregate flows based on at least one particular duration of said one or more durations that the utilization of the resource was not in the congested condition.

One embodiment includes: policing, at corresponding policing rates by a second plurality of policers of the particular machine, a second plurality of aggregate flows of packet traffic in transit to the resource; wherein each of the second plurality of aggregate flows of packet traffic is said rate limited by a different one of the second plurality of policers; and adjusting, by the particular machine, at least one said policing rate of one or more of the second plurality of policers by an amount relative to the utilization of the resource; wherein the amount of utilization of the resource is affected by packets of the second plurality of aggregate flows of packet traffic. In one embodiment, the particular machine includes a first card, a second card, and a third card; and wherein the plurality of policers are located on the first card, the second plurality of policers are located on the second card, and the resource is located on the third card. In one embodiment, the particular machine is a packet switching device including a plurality of line cards and a route processor; wherein the plurality of policers are located on one of the plurality of line cards, the second plurality of policers are located on a different one of the plurality of line cards; and the resource is the route processor not located on one of the plurality of line cards.

In one embodiment, the plurality of policers are located on a card of the particular machine and the resource is located on a different card of the particular machine. In one embodiment, the particular machine is a packet switching device including a first line card; wherein the plurality of policers are located on the first line card, and the resource is not located on the first line card. In one embodiment, said operation of adjusting of at least one said policing rate reduces, but does not stop, allowed traffic of corresponding one or more of the plurality of aggregate flows of packet traffic.

One embodiment includes a packet switching device, comprising: a resource; and a plurality of policers, with each of the plurality of policers individually configurable to a policing rate for policing packet traffic of an aggregate packet flow of a plurality of aggregate flows of packet traffic; a resource utilization level determiner configured to identify one or more levels of utilization of the resource, with said one or more levels of utilization being affected by the plurality of aggregate flows of packet traffic; and a rate adjustment mechanism configured to adjust, including decreasing and increasing, the policing rates of the plurality of policers based on said identified one or more levels of utilization of the resource; wherein said decreasing of at least one of the policing rates of the plurality of policers includes reducing a corresponding said policing rate to an allowed traffic rate less than its previous policing rate but greater than zero.

In one embodiment, said adjusting of the policing rates of the plurality of policers is performed based on one or more durations that the resource is said identified by the resource utilization level determiner to be at one or more predetermined utilization levels. In one embodiment, the resource includes one or more elements from a group of elements comprising: a queue and a processing element. In one embodiment, the plurality of policers are located on a line card of the packet switching device, and the resource is located in the packet switching device, but not on the line card. In one embodiment, the resource is a route processor. In one embodiment, at least one of said one or more predetermined utilization levels corresponds to the utilization of the resource being in a congested condition; and wherein the rate adjustment mechanism is configured to reducing the allowed traffic rate of at least one of the plurality of policers by an amount of rate determined based on a duration of the utilization of the resource being identified in the congested condition. In one embodiment, said policing operation is defined as rate-limiting of traffic to a predetermined rate by either allowing, dropping, or marking for dropping of packets, but not delaying the sending of a packet until the flow is within the predetermined rate.

One embodiment includes a packet switching device, comprising: a control or router processing card, including a resource; a plurality of line cards, with each of the plurality of line cards including a group of a plurality of policers, with each of the plurality of policers individually configurable to a policing rate for policing packet traffic of a packet flow of a plurality of aggregate flows of packet traffic; a resource utilization level determiner configured to identify one or more levels of utilization of the resource, with said one or more levels of utilization being affected by said plurality of groups of said plurality of aggregate flows of packet traffic; and a rate adjustment mechanism configured to adjust, including decreasing and increasing, the policing rates of the plurality of policers on each of the plurality of line cards based on said identified one or more levels of utilization of the resource; wherein said decreasing of at least one of the policing rates of the plurality of policers includes reducing a corresponding said policing rate to an allowed traffic rate less than its previous policing rate but greater than zero.

In one embodiment, said adjusting of the policing rates of the plurality of policers on each of the plurality of line cards is performed based on one or more durations that the resource is said identified by the resource utilization level determiner to be at one or more predetermined utilization levels. In one embodiment, the resource includes one or more elements from a group of elements comprising: a queue and a processing element. In one embodiment, said policing operation is defined as rate-limiting of traffic to a predetermined rate by either allowing, dropping, or marking for dropping of packets, but not delaying the sending of a packet until the flow is within the predetermined rate.

Figure 1:
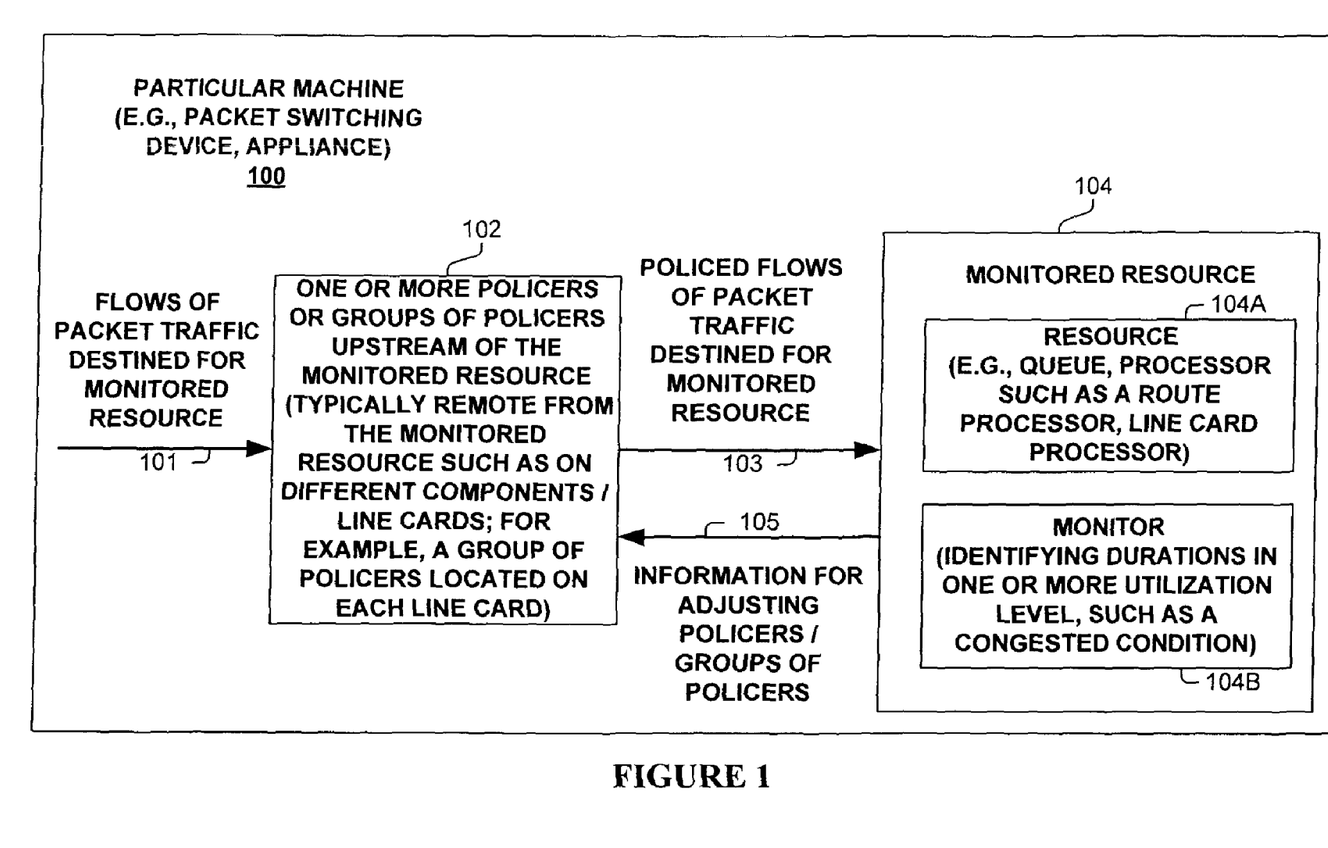
FIG. 1 illustrates a network operating according to one embodiment.

Expressly turning to the figures, FIG. 1 illustrates a particular machine (100) (e.g., a packet switching device, packet switching appliance) which is configured to operate according to one embodiment. As shown, aggregate flows of packet traffic (101) arrive at one or more policers (102) or groups of policers (102) upstream of the monitored resource (104) being protected by these policers (102). In one embodiment, a single policer (102) is used. However, in one embodiment and typically, multiple policers (102) are used at a location, with each of the policers (102) to police a different aggregate flow of packet traffic (101). Typically, a group of policers (102) is located remotely from monitored resource (104). For example, if the monitored resource (104) is one or more queues or a processor associated with route processing such as on a controller card, a group of policers (102) might be located on a line card or even a group of policers (102) might be located on each of multiple line cards. Therefore, the traffic is dropped remotely by a policer (102) from the monitored resource (104), such that additional resources of the particular machine (e.g., packet switching device) are not used to carry the traffic from a line card to a controller card and then dropped by a policer (102).

Note, the modifier "aggregate" is used in the term aggregate packet flow to emphasize that each policer (102) will typically police multiple traditional packet flows (e.g., those identified by a specific five-tuple of source address, destination address, source port, destination port, protocol type). If the aggregate flows have not been previously identified for a packet, policer block (102) will typically perform, or cause to be performed, a classification operation to classify the packet into one of the possible aggregate flows associated with a policer (102). Examples of possible classification operations include, but are not limited to, a lookup operation (e.g., on a ternary content-addressable memory), deep-packet inspection, and/or hashing function. In one embodiment, the definition of each aggregate flow (101) is user-specified. In one embodiment, each aggregate flow (101) corresponds to a different level of prioritized traffic, inherent in the packet or identified by a classification operation. In one embodiment, the packet has been previously classified into one of the aggregate flows as identifier associated with the packet (e.g., carried in an internal label).

As shown in FIG. 1, packets of the policed aggregate flows of packet traffic (103) not dropped by a policer (102) are communicated to monitored resource (104) (of course, unless dropped or diverted by another feature). Monitored resource (104) includes the particular resource (104A), such as, but not limited to, one or more queues, processors, (e.g., route processor, control processor), memories, etc.

Monitored resource (104) also includes the monitor (104B), which is configured to identify the utilization of the resource (104A), typically including identifying one or more durations of utilization of one or more utilization levels. One embodiment identifies one or more congestion levels during a sampling period. For example, one embodiment employs dual utilization levels (i.e., either congested or not congested), and identifies during the sampling period whether or not monitored resource (104) was congested at anytime during the sampling period. One embodiment identifies how much time monitored resource (104) was in each of the utilization levels during the sampling period. Furthermore, one embodiment identifies whether the utilization of monitored resource (104) is increasing or decreasing, which is used in one embodiment in determining how aggressively to adjust one or more policers (102). This identified utilization characteristic of monitored resource (104) during a sampling period is used to determine how to adjust policers (102), which are responsive to information (105) for adjusting policers/groups of policers.

In one embodiment, monitored resource (104) determines adjusted policer rates for policers (102), and provides this configuration information (105) (e.g., rates, token bucket fill rates, etc.) to policers (102) which are accordingly updated. In one embodiment, monitored resource (104) identifies characteristics of the utilization during the sampling period, and provides this information (105) (e.g., utilization levels, associated duration within one or more utilization levels, increasing or decreasing utilization indication, etc.) to policers (102), which use this received information (102) to determine how to update policers (102), which are accordingly updated. In other words, the determination of the adjusted policer rates based on one more utilization levels (and possibly corresponding durations within these utilization levels) can be performed by the monitored resource (104) (with the definition of monitored resource 104 possibly including a processor local or remote to resource 104A), or by policers 102 (with the definition of the policers 102 possibly including a processor local or remote to policers 102).

Thus, as illustrated in FIG. 1, policers (102) receive packets of aggregate flows (101) of packet traffic, which are to be communicated to monitored resource (104). The utilization levels of monitored resource (104) are induced by these aggregate flows (101) of packet traffic. Based on the observed utilization levels (including possibly measured durations in one or more of these utilization levels), a determination is made if, and how to adjust policers (102) for policing their respective aggregate flow (101), with policers (102) being adjusted accordingly. Additionally, policers (102) are typically located remotely from monitored resource (104) (i.e., not immediately before monitored resource 104 in the flow of packet traffic), such as on different cards; including, for example, with a group of policers on each line card for policing the same aggregate flows to be communicated to monitored resource (104). In this manner, adaptive policers are responsive to one or more utilization levels (including possible durations at these utilization levels—i.e., a persistence of the congestion for the resource) of one or more monitored resources, with these identified utilization levels (and possibly durations) used in determining how much to modify a policing rate.

Figure 2:
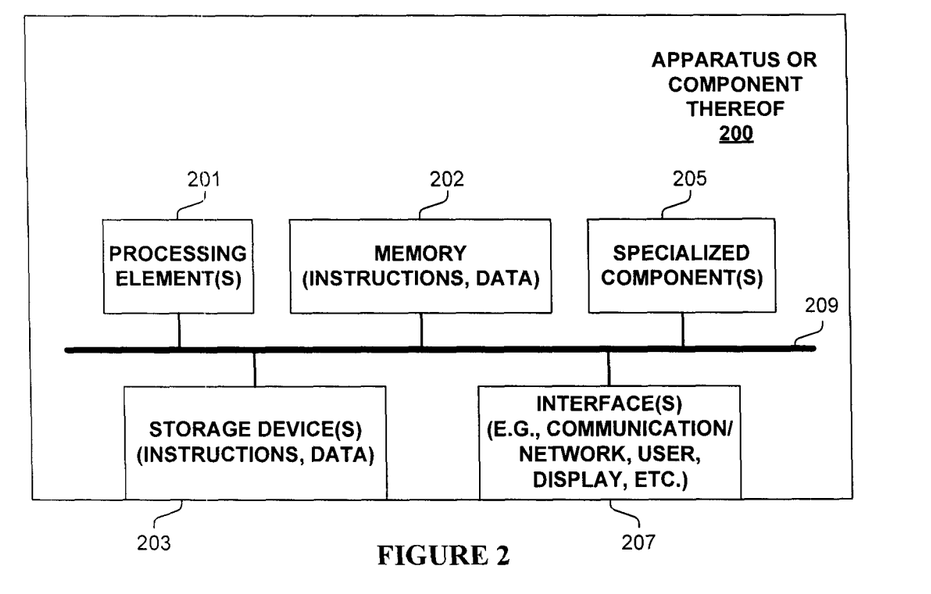
FIG. 2 illustrates an apparatus or component used in one embodiment.

FIG. 2 is block diagram of an apparatus or component 200 used in one embodiment associated with adaptive policers responsive to one or more utilization levels of one or more monitored resources. In one embodiment, apparatus or component 200 performs one or more processes corresponding to one of the flow diagrams illustrated or otherwise described herein.

In one embodiment, apparatus or component 200 includes one or more processing element(s) 201, memory 202, storage device(s) 203, specialized component(s) 205 (e.g. optimized hardware such as for performing operations such as classification operations and resource utilization monitoring/duration identification, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, particular machine 100 of FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3A:
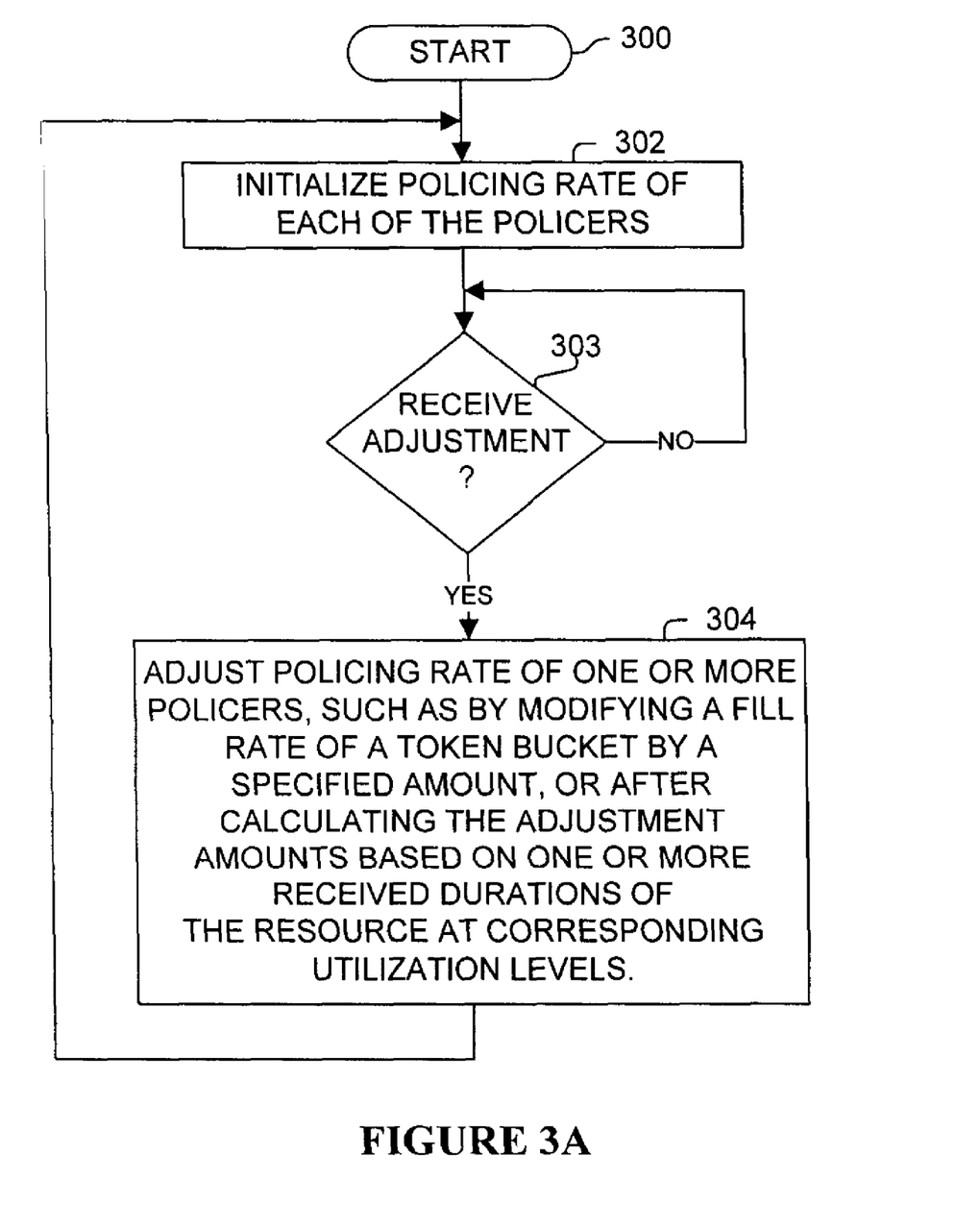
FIG. 3A illustrates a process performed in one embodiment.

FIG. 3A illustrates a process performed in one embodiment. Processing begins with process block 300, and in process block 302, each of the policers are initialized to their respective initial policing rates. As determined in process block 303, when an adjustment has been received, then in process block 304, the policing rate of one or more policers is accordingly adjusted. For example, a fill rate of a token bucket implementation could be increased to increase the amount of traffic allowed, or decreased to decrease the amount of traffic allowed (i.e., causing more packets to be dropped). In one embodiment, the new adjusted policing rates are provided; while in one embodiment, the new adjusted policing rates must be determined from the utilization data provided about the monitored resource (e.g., based on the utilization/congestion of the resource, possibly based on one or more durations as one or more utilization/congestion levels of the monitored resource), with these identified utilization levels (and possibly durations) used in determining how much to modify a policing rate. Processing returns to process block 304.

Figure 3B:
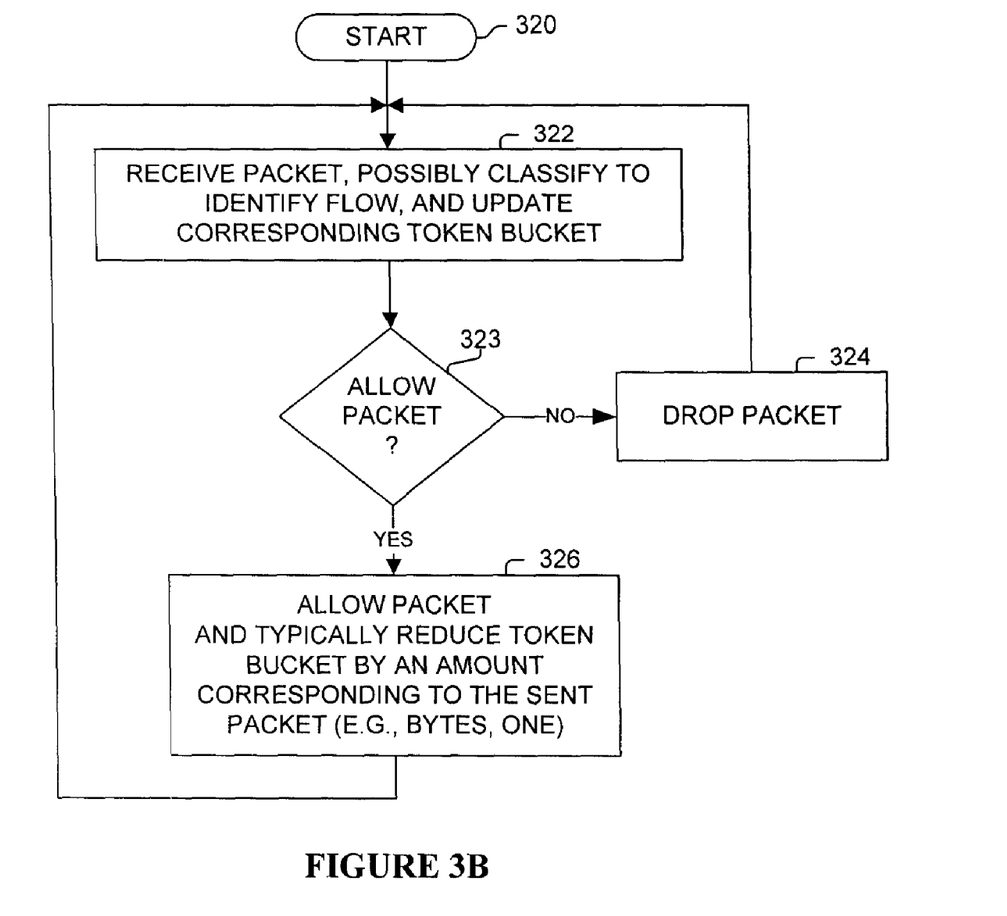
FIG. 3B illustrates a process performed in one embodiment.

FIG. 3B illustrates a process performed in one embodiment. Processing begins with process block 320. In process block 322, a packet is received by a group of policers, possibly classified to identify which aggregate flow it belongs, thus identifying a particular policer for the packet. Additionally, in a token bucket implementation, the token bucket is updated to the amount of tokens it should have at this point in time. (Note, this updating of token buckets is work-conserving, while one embodiment regularly fills all token buckets.) As determined in process block 323, if the packet is to be allowed (e.g., there are enough tokens in a token bucket implementation), then in process block 326, the packet is forwarded towards the monitored resource, and its token bucket is accordingly reduced in a token bucket implementation. Otherwise, in process block 324, the packet is dropped (e.g., typically dropped, but could also be marked for subsequent dropping). Processing returns to process block 322.

Figure 4:
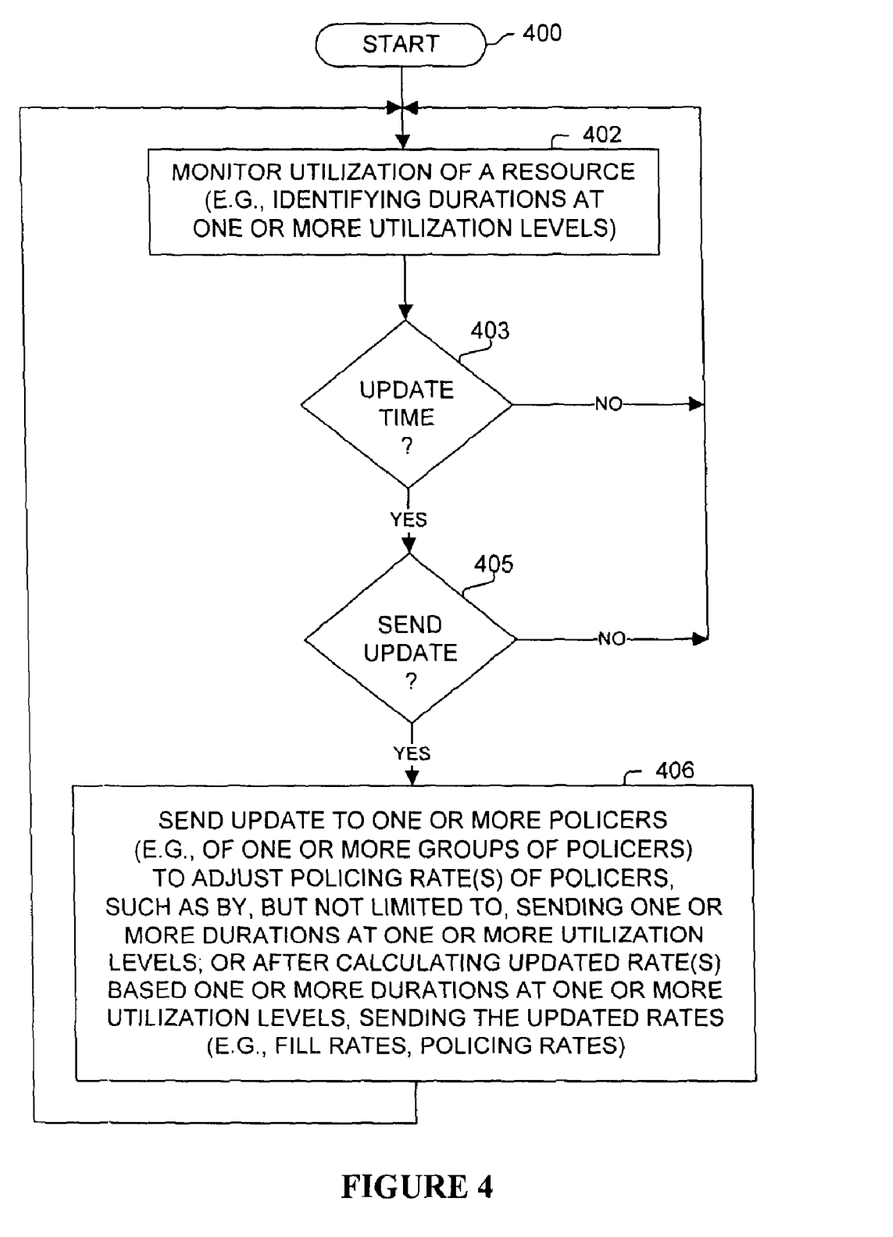
FIG. 4 illustrates a process performed in one embodiment.

FIG. 4 illustrates a process performed in one embodiment. Processing begins with process block 400. During a sampling period determined by process block 403, while in process block 402, the utilization of a resource is monitored (e.g., identifying a current utilization level and possibly updating a duration at that utilization level). At the completion of the sample period as determined by process block 403, if there is no update of the policers required, then processing returns to process block 402 for the next sample time.

Otherwise, before returning to process block 402: in process block 406, an update is communicated to one or more policers for updating its policing rate. This update may be the actual new adjusted policing rate (e.g., rate, token fill rate) for one or more policers, or it might be utilization data (e.g., utilization levels, durations) from which the policing unit can determine the new adjusted policing rate for one or more policers.

In one embodiment, the measured duration at one or more utilization levels and/or whether the utilization of the resource is increasing or decreasing determines the slope of the increase or decrease of policing rates. For example, in one embodiment, if the monitored resource is congested for a substantial duration of the sample period, then the policing rate of one or more policers will be decreased greater than if the monitored resource was only congested for a minimal or smaller duration of the sample period. Further, in one embodiment, if the utilization of the resource is decreasing over the sample period but still in a congested utilization level, the decreased adjustment of the policing rate of a policer will be less than if the utilization of the resource is increasing over the sample period. Similarly, in one embodiment, the amount of increasing the allowed packet rate of a policer is responsive to the duration at one or more utilization levels and/or whether the utilization of the resource is increasing or decreasing. Further, in one embodiment, different aggregate flows of traffic are effectively identified with priorities of traffic, such that a policer associated with a lower-priority aggregate flow of traffic can be adjusted by a different policing rate than a higher-priority aggregate flow of traffic. Thus, the policing rate of each policer is independently configurable in one embodiment.

Figure 5:
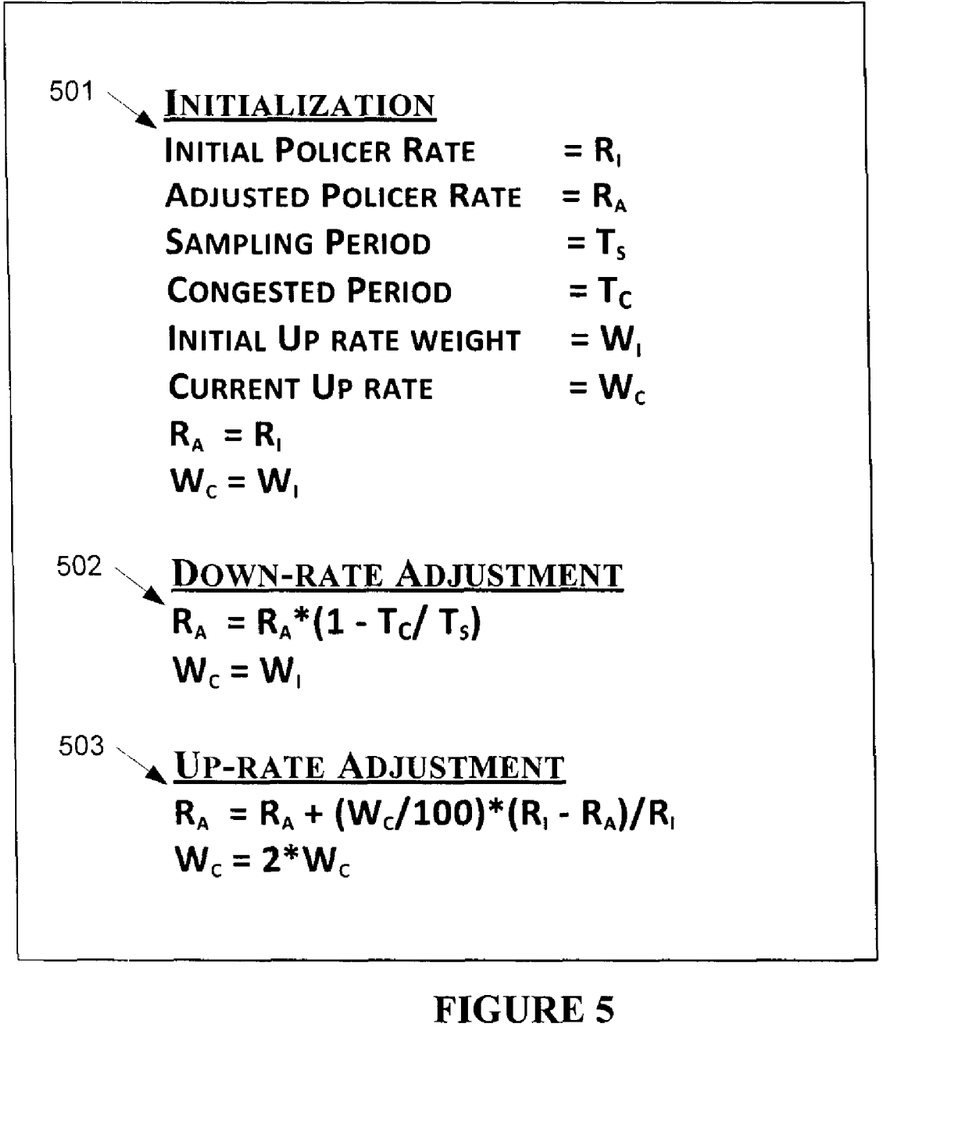
FIG. 5 illustrates a process performed in one embodiment.

FIG. 5 illustrates the adjustment of policing rates performed in one embodiment. As shown, policing rates and variables are initialized (501). In response to a duration of identified congestion, the current policing rate of a policer is decreased (502) by an amount determined based on the duration of the sample period that the resource was identified as being congested. In response to a duration of no identified congestion, the current policing rate of a policer is increased (503) by a rate based on the initial and current policing rates. Note, in one embodiment, the policing rate of a policer is increased by an amount determined based on the duration of the sample period that the resource was identified as not being congested when the utilization of the resource is decreasing (e.g., was initially congested during the sample period, then was not congested for the remainder of the sample period).

Figure 6:
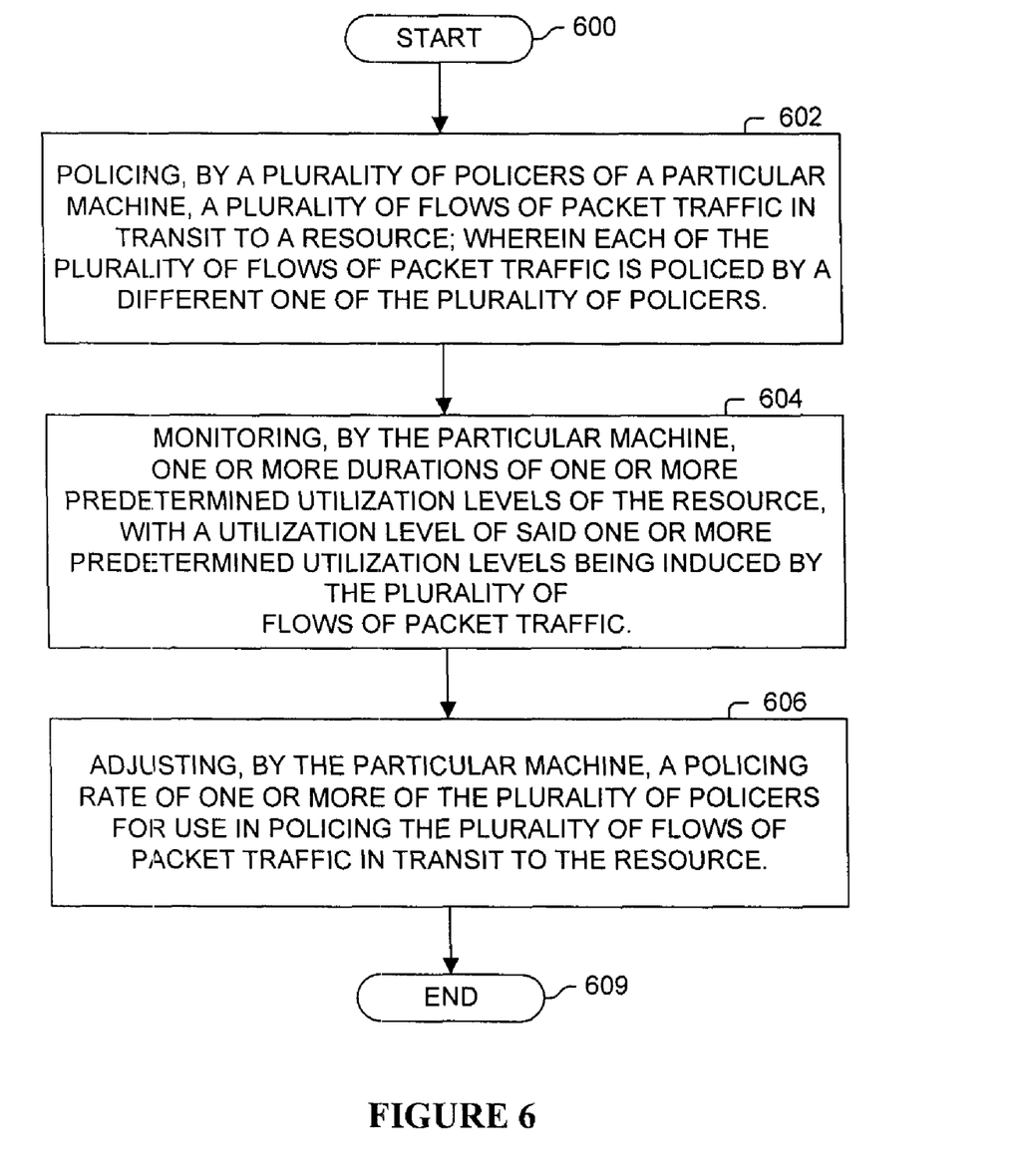
FIG. 6 illustrates a process performed in one embodiment.

FIG. 6 illustrates a process performed in one embodiment. Processing begins with process block 600. In process block 602, a plurality of policers of a particular machine police a plurality of aggregate flows of packet traffic in transit to a resource; wherein each of the plurality of aggregate flows of packet traffic is policed by a different one of the plurality of policers. In process block 604, one or more durations of one or more predetermined utilization levels of the resource are monitored, with a utilization level of said one or more predetermined utilization levels being induced by the plurality of aggregate flows of packet traffic. In process block 606, a policing rate of one or more of the plurality of policers for use in policing the plurality of aggregate flows of packet traffic in transit to the resource is adjusted. Processing of the flow diagram of FIG. 6 is complete as indicated by process block 609.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
   policing, at corresponding policing rates by a plurality of policers of a particular machine, a plurality of aggregate flows of packet traffic in transit to a resource; wherein each of the plurality of aggregate flows of packet traffic is said rate limited by a different one of the plurality of policers; and
   adjusting, by the particular machine, at least one said policing rate of one or more of the plurality of policers by an amount relative to a utilization of the resource; wherein the amount of utilization of the resource is affected by packets of the plurality of aggregate flows of packet traffic.

2. The method of claim 1, wherein said policing operation is defined as rate-limiting of traffic to a predetermined rate by allowing, dropping, or marking for dropping of packets, but not delaying the sending of a packet, until the flow is within the predetermined rate.

3. The method of claim 1, wherein the plurality of policers are co-located on a card of the particular machine, and the resource is located on a different card of the particular machine.

4. The method of claim 1, wherein the resource is a processing element.

5. The method of claim 1, wherein said adjusting of the policing rate includes changing the fill rate of a token bucket associated with a policer of the plurality of policers.

6. The method of claim 1, wherein the amount of said adjusting operation is determined based on one or more durations that the amount of utilization of the resource is at one or more predetermined utilization levels.

7. The method of claim 1, wherein at least one of said one or more predetermined utilization levels corresponds to the utilization of the resource being in a congested condition; and wherein said adjusting of at least one said policing rate results in reducing an allowed traffic rate of at least one of the plurality of aggregate flows based on at least one particular duration of said one or more durations that the utilization of the resource was in the congested condition.

8. The method of claim 1, wherein at least one of said one or more predetermined utilization levels corresponds to the utilization of the resource not being in a congested condition; and wherein said adjusting of at least one said policing rate results in increasing an allowed traffic rate of at least one of the plurality of aggregate flows based on at least one particular duration of said one or more durations that the utilization of the resource was not in the congested condition.

9. The method of claim 1, comprising:
policing, at corresponding policing rates by a second plurality of policers of the particular machine, a second plurality of aggregate flows of packet traffic in transit to the resource; wherein each of the second plurality of aggregate flows of packet traffic is said rate limited by a different one of the second plurality of policers; and
adjusting, by the particular machine, at least one said policing rate of one or more of the second plurality of policers by an amount relative to the utilization of the resource; wherein the amount of utilization of the resource is affected by packets of the second plurality of aggregate flows of packet traffic.

10. The method of claim 9, wherein the particular machine includes a first card, a second card, and a third card; and wherein the plurality of policers are located on the first card, the second plurality of policers are located on the second card, and the resource is located on the third card.

11. The method of claim 9, wherein the particular machine is a packet switching device including a plurality of line cards and a route processor; wherein the plurality of policers are located on one of the plurality of line cards, the second plurality of policers are located on a different one of the plurality of line cards; and the resource is the route processor not located on one of the plurality of line cards.

12. The method of claim 1, wherein the plurality of policers are located on a card of the particular machine and the resource is located on a different card of the particular machine.

13. The method of claim 1, wherein the particular machine is a packet switching device including a first line card; wherein the plurality of policers are located on the first line card, and the resource is not located on the first line card.

14. The method of claim 1, wherein said operation of adjusting of at least one said policing rate reduces, but does not stop, allowed traffic of corresponding one or more of the plurality of aggregate flows of packet traffic.

15. A packet switching device, comprising:
a resource;
a plurality of policers, with each of the plurality of policers individually configurable to a policing rate for policing packet traffic of an aggregate packet flow of a plurality of aggregate flows of packet traffic;
a resource utilization level determiner configured to identify one or more levels of utilization of the resource, with said one or more levels of utilization being affected by the plurality of aggregate flows of packet traffic; and
a rate adjustment mechanism configured to adjust, including decreasing and increasing, the policing rates of the plurality of policers based on said identified one or more levels of utilization of the resource; wherein said decreasing of at least one of the policing rates of the plurality of policers includes reducing a corresponding said policing rate to an allowed traffic rate less than its previous policing rate but greater than zero.

16. The packet switching device of claim 15, wherein said adjusting of the policing rates of the plurality of policers is performed based on one or more durations that the resource is said identified by the resource utilization level determiner to be at one or more predetermined utilization levels.

17. The packet switching device of claim 16, wherein the resource includes one or more elements from a group of elements consisting of: a queue and a processing element.

18. The packet switching device of claim 16, wherein the plurality of policers are located on a line card of the packet switching device, and the resource is located in the packet switching device, but not on the line card.

19. The packet switching device of claim 18, wherein the resource is a route processor.

20. The packet switching device of claim 16, wherein at least one of said one or more predetermined utilization levels corresponds to the utilization of the resource being in a congested condition; and wherein the rate adjustment mechanism is configured to reducing the allowed traffic rate of at least one of the plurality of policers by an amount of rate determined based on a duration of the utilization of the resource being identified in the congested condition.

21. The packet switching device of claim 15, wherein said policing operation is defined as rate-limiting of traffic to a predetermined rate by either allowing, dropping, or marking for dropping of packets, but not delaying the sending of a packet until the flow is within the predetermined rate.

22. A packet switching device, comprising:
a control or router processing card, including a resource;
a plurality of line cards, with each of the plurality of line cards including a group of a plurality of policers, with each of the plurality of policers individually configurable to a policing rate for policing packet traffic of a packet flow of a plurality of aggregate flows of packet traffic;
a resource utilization level determiner configured to identify one or more levels of utilization of the resource, with said one or more levels of utilization being affected by said plurality of groups of said plurality of aggregate flows of packet traffic; and
a rate adjustment mechanism configured to adjust, including decreasing and increasing, the policing rates of the plurality of policers on each of the plurality of line cards based on said identified one or more levels of utilization of the resource; wherein said decreasing of at least one of the policing rates of the plurality of policers includes reducing a corresponding said policing rate to an allowed traffic rate less than its previous policing rate but greater than zero.

23. The packet switching device of claim 22, wherein said adjusting of the policing rates of the plurality of policers on each of the plurality of line cards is performed based on one or more durations that the resource is said identified by the resource utilization level determiner to be at one or more predetermined utilization levels.

24. The packet switching device of claim 23, wherein the resource includes one or more elements from a group of elements consisting of: a queue and a processing element.

25. The packet switching device of claim 22, wherein said policing operation is defined as rate-limiting of traffic to a predetermined rate by either allowing, dropping, or marking for dropping of packets, but not delaying the sending of a packet until the flow is within the predetermined rate.

26. The method of claim 1, wherein the resource is a queue.

* * * * *